(12) United States Patent
Limber

(10) Patent No.: US 12,018,795 B1
(45) Date of Patent: Jun. 25, 2024

(54) SYSTEM AND METHOD FOR ADHESIVE DECORATION-SECURING CLIP

(71) Applicant: Simple Living Solutions, LLC, Scottsdale, AZ (US)

(72) Inventor: Jamie Limber, Phoenix, AZ (US)

(73) Assignee: Simple Living Solutions, LLC, Scottsdale, AZ (US)

( * ) Notice: Subject to any disclaimer, the term of this patent is extended or adjusted under 35 U.S.C. 154(b) by 59 days.

(21) Appl. No.: 17/562,619

(22) Filed: Dec. 27, 2021

Related U.S. Application Data

(63) Continuation of application No. 29/801,425, filed on Jul. 28, 2021, now Pat. No. Des. 1,002,357.

(51) Int. Cl.
*F16M 13/02* (2006.01)
*C09J 7/38* (2018.01)
*F16B 2/20* (2006.01)

(52) U.S. Cl.
CPC .............. *F16M 13/02* (2013.01); *C09J 7/385* (2018.01); *F16B 2/20* (2013.01); *C09J 2433/00* (2013.01)

(58) Field of Classification Search
CPC ....... F16M 13/02; C09J 7/385; C09J 2433/00; F16B 2/20; F21V 21/088; Y10T 24/1394; Y10T 24/44
See application file for complete search history.

(56) References Cited

U.S. PATENT DOCUMENTS

| | | | | | |
|---|---|---|---|---|---|
| 5,695,273 | A | * | 12/1997 | Lanning | F21S 4/20 362/249.11 |
| D696,105 | S | * | 12/2013 | Devilliers | D8/395 |
| D756,764 | S | * | 5/2016 | Limber | D8/395 |
| D856,791 | S | * | 8/2019 | Limber | D8/395 |
| 2018/0017240 | A1 | * | 1/2018 | Schreiber | F21S 4/10 |
| 2021/0248982 | A1 | * | 8/2021 | Mahmoud | G10G 5/00 |

* cited by examiner

*Primary Examiner* — Bradley Duckworth
(74) *Attorney, Agent, or Firm* — Michelle L. Gross, P.C.

(57) ABSTRACT

A system and method for removably securing a decoration to a variety of surfaces by removing a liner from an adhesive pad to expose an adhesive layer, placing the exposed adhesive layer against a surface to secure the clip to a surface, and placing a decoration such as a holiday string light within the clip. The clip may be tightened to fit snugly around a decoration, and the clip may be rotated such that the clip is at approximately a 90-degree angle with the adhesive pad. A hook and catch system on the clip and neck provide additional support, so that even when rotated the clip can adequately support the weight of the decoration. This allows for decorations to be hung in a variety of orientations, or to orient string lights so that wires and cables do not interfere with other decorations.

19 Claims, 6 Drawing Sheets

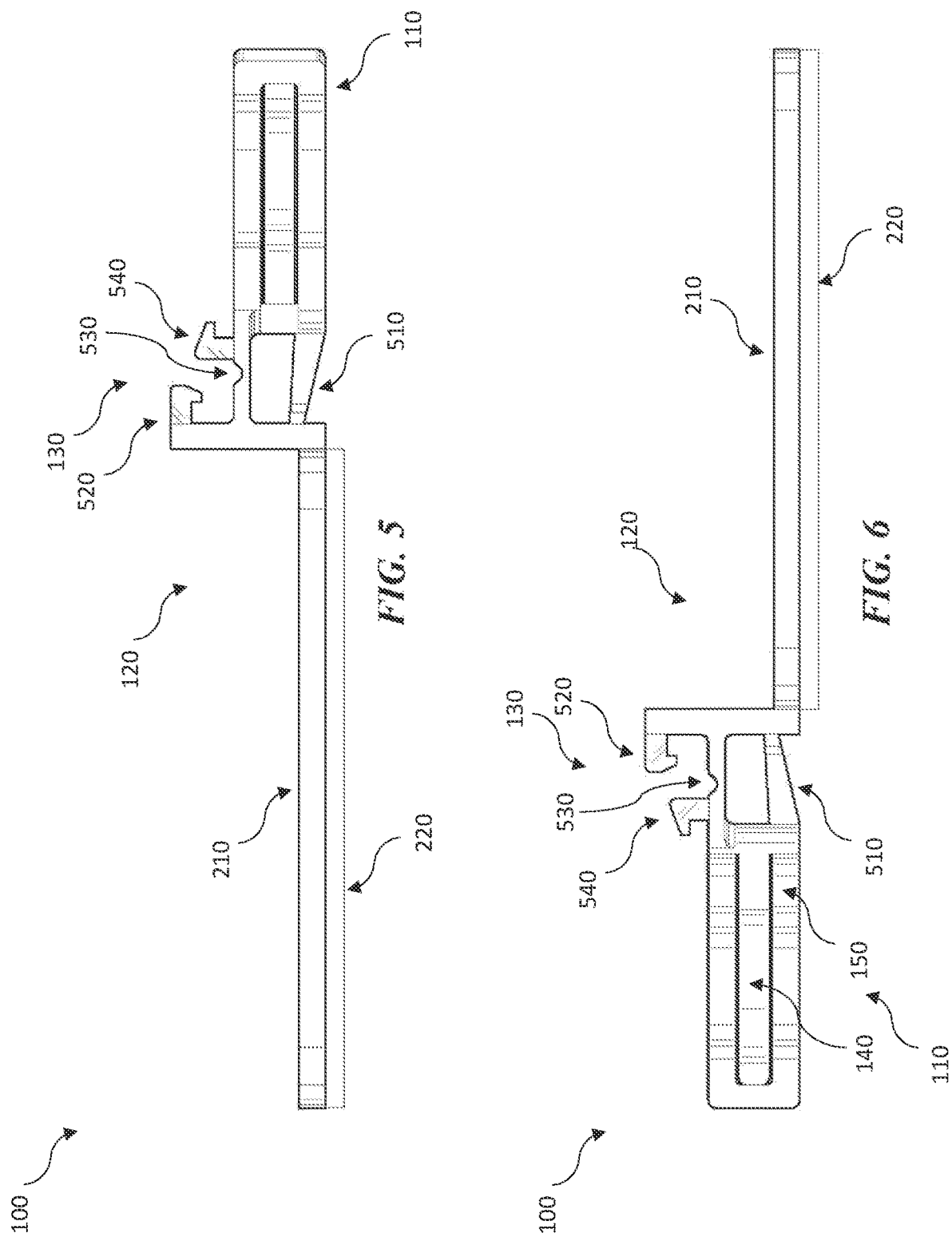

SYSTEM AND METHOD FOR ADHESIVE DECORATION-SECURING CLIP

CROSS REFERENCE TO RELATED APPLICATIONS

This application claims priority to U.S. application Ser. No. 29/801,425 entitled "Adhesive Clip" to Jamie Limber, filed on Jul. 28, 2021.

BACKGROUND

1. Field of the Invention

The field of the present invention generally relates to temporarily securing, placing, and installing decorations on a variety of surfaces.

2. Description of Related Art

Many methods for hanging decorations require the use of a permanent fastener such as a nail or staple leaving permanent damage on the surface of the structure such as a house or other building. Other wall mount devices may have rigid structures or hooks that limit the orientations in which the decoration can be displayed or the type of decoration that they can support. This can result in needing to purchase several different tools and devices for mounting different decorations on various surfaces.

SUMMARY

Implementations of an apparatus for hanging decorations may comprise a non-adhesive surface, an adhesive pad comprising at least one adhesive surface, the adhesive pad coupled to the non-adhesive surface, a neck coupled to the non-adhesive surface at a first end of the non-adhesive surface, the neck substantially perpendicular to the non-adhesive surface, and a clip coupled to the neck at a point substantially distal from the non-adhesive surface. The clip may be substantially perpendicular to the neck and may comprise a first prong and a second dual-layer prong comprising a channel between a first layer and a second layer of the second dual-layer prong, the second dual-layer prong configured such that at least a portion of the first prong fits within the channel between the first and second layers of the second dual-layer prong and forms a substantially round structure configured to house a decoration therein.

Particular aspects may comprise one or more of the following features. The adhesive pad may comprise at least one of an acrylic adhesive and a nano tape adhesive. The first prong may further comprise a nub at a point distal from the neck, the nub configured to fit within the configured to fit within the channel between the first and second layers of the second dual-layer prong, such that when the first prong is fitted within channel of the second dual-layer prong, the nub prevents the first prong from freely sliding back to its original position. The neck may further comprise a support strut which extends from a point substantially distal from the adhesive pad, the support strut coupled to the clip at a point along the strut distal to the neck. The adhesive pad may further comprise a non-adhesive liner coupled basally to the adhesive surface. The apparatus may further comprise a hook coupled to the clip at a point on the clip proximal to the neck and a catch coupled to the neck at a point on the neck distal to the adhesive pad, the catch configured such that when the clip is rotated toward the catch, the hook couples with the catch, and prevents the clip from freely rotating away from the catch. The first prong may comprise a first curved segment and a second curved segment, the second curved segment being substantially wider than the first curved segment and the second dual-layer prong may comprise a third curved segment and a fourth curved segment, the fourth curved segment being substantially wider than the third curved segment, and configured such that when the first prong is fitted within the channel of the second dual-layer prong, the clip forms two substantially circular gaps of different radii.

Implementations of an apparatus for hanging decorations may comprise a non-adhesive surface, an adhesive pad comprising at least one adhesive surface, the adhesive pad coupled to the non-adhesive surface, a neck coupled to the non-adhesive surface at a first end of the non-adhesive surface, the neck substantially perpendicular to the non-adhesive surface, a catch coupled to the neck at a point on the neck distal from the adhesive pad, and a clip coupled to the neck at a point between the non-adhesive surface and the catch. The clip may be substantially perpendicular to the neck and may comprise a first prong and a second dual-layer prong comprising a channel between a first layer and a second layer of the second dual-layer prong, the second dual-layer prong configured such that at least a portion of the first prong fits within the channel between the first and second layers of the second dual-layer prong and forms a substantially round structure. The apparatus may further comprise a hook coupled to the clip at a point on the clip proximal to the neck, the hook may be configured such that when the clip is rotated toward the catch and the hook may couple with the catch and prevent the clip from freely rotating away from the catch.

Particular aspects may comprise one or more of the following features. The adhesive pad may comprise at least one of an acrylic adhesive and a nano tape adhesive. The first prong further comprises a nub at a point distal from the neck, the nub configured to fit within the channel between the first and second layers of the second dual-layer prong, such that when the first prong is fitted within channel of the second dual-layer prong, the nub prevents the first prong from freely sliding back to its original position. The neck may further comprise a support strut coupled to the clip at a point along the strut distal from the neck. The support strut may be configured to decouple from the clip when the clip is rotated toward the catch. The adhesive pad may further comprise a non-adhesive liner coupled basally to the adhesive surface. The clip may be further modified such that the first prong may comprise a first curved segment and a second curved segment, the second curved segment being substantially wider than the first curved segment and the second dual-layer prong may comprise a third curved segment and a fourth curved segment, the fourth curved segment being substantially wider than the third curved segment, and configured such that when the first prong is fitted within the channel of the second dual-layer prong, the clip forms two substantially circular gaps of different radii.

Implementations of a method for hanging decorations may comprise attaching a decoration hanging clip to a surface, the decoration hanging clip comprising a non-adhesive surface, an adhesive pad comprising at least one adhesive surface, the adhesive pad coupled to the non-adhesive surface, a neck coupled to the non-adhesive surface at a first end of the non-adhesive surface, the neck substantially perpendicular to the non-adhesive surface. The decoration hanging clip may further comprise a catch coupled to the neck at a point on the neck distal from the adhesive pad, a clip coupled to the neck at a point between the non-adhesive surface and the catch, the clip substantially perpendicular to the neck and comprising a first prong and a second dual-layer prong comprising a channel between a first layer and a second layer of the second dual-layer prong, the second dual-layer prong configured such that at least a portion of the first prong fits within the channel between the first and second layers of the second dual-layer prong and forms a substantially round structure, and a hook coupled to the clip at a point on the clip proximal to the neck, the hook configured such that when the clip is rotated toward the catch, the hook couples with the catch, and prevents the clip from freely rotating away from the catch. The method may further comprise securing a decoration within the clip between the first prong and the second dual-layer prong.

Particular aspects of the method may comprise one or more of the following steps and features. The method may further comprise applying pressure to at least one of the first prong and the second dual-layer prong to cause the first prong to fit within the second dual-layer prong until the substantially round structure snugly fits a size of the decoration. The decoration hanging clip may further comprise a non-adhesive liner coupled basally to the adhesive surface and the method further comprise removing the non-adhesive liner from the adhesive surface. The first prong of the decoration hanging clip further may further comprise a nub at a point distal from the neck, the nub configured to fit within the channel between the first and second layers of the second dual-layer prong, such that when the first prong is fitted within channel of the second dual-layer prong, the nub prevents the first prong from freely sliding back to its original position. The method may further comprise rotating the clip of the decoration hanging clip until the hook is coupled to the catch.

The decoration hanging clip may also further comprise the first prong having a first curved segment and a second curved segment, the second curved segment being substantially wider than the first curved segment and the second dual-layer prong may comprise a third curved segment and a fourth curved segment, the fourth curved segment being substantially wider than the third curved segment, and configured such that when the first prong is fitted within the channel of the second dual-layer prong, the clip forms two substantially circular gaps of different radii.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographers, to use only the plain and ordinary meaning of terms in the specification and claims unless he clearly states otherwise and then further, expressly sets forth the "special" definition of that term and explains how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. § 112(f). Thus, the use of the words "function," "means" or "step" in the Detailed Description or Description of the Drawings or Claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of 35 U.S.C. § 112(f). Moreover, even if the provisions of 35 U.S.C. § 112(f) are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DETAILED DESCRIPTION, DRAWINGS, and CLAIMS.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

FIG. 5 and FIG. 6 representatively illustrate side views of an embodiment of a decoration hanging clip.

DETAILED DESCRIPTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

Figure 1:
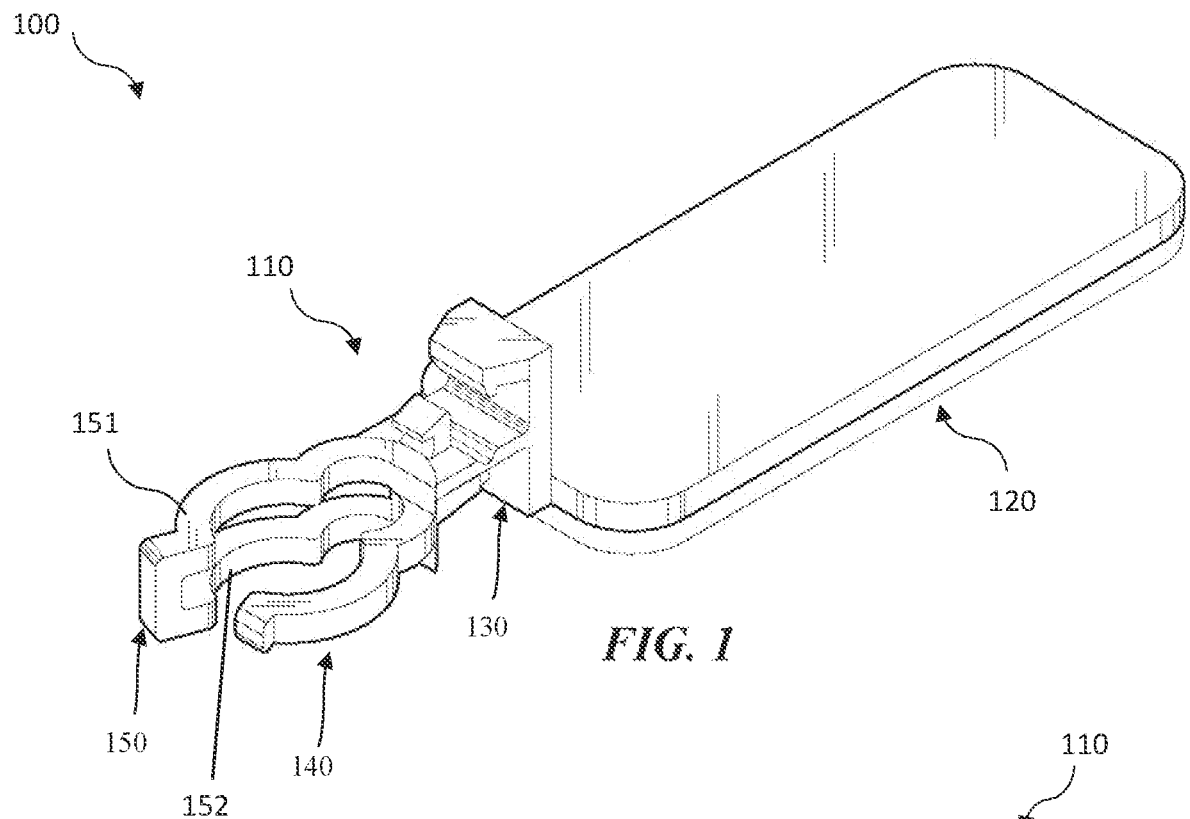
FIG. 1 representatively illustrates a top perspective view of an embodiment of a decoration hanging clip.

The present disclosure relates to systems and methods for securing decorations to various surfaces and at various angles and positions via a clip and adhesive pad. Referring now to FIG. 1, an exemplary embodiment of a decoration hanging clip 100 is shown. In many embodiments the decoration hanging clip is comprised of a clip 110, a non-adhesive surface 210, an adhesive pad 120, and a neck 130 joining the clip, non-adhesive surface 210, and adhesive pad 120 together. In these and other embodiments the clip 110 may further comprise a first prong 140 and a second prong 150. In some exemplary embodiments, as shown, the second prong 150 may be a dual-layer prong comprising a first layer 151 and a second layer 152 with a channel 153 between the first 151 and second 152 layers. In some embodiments the clip 110 is constructed of manually deformable plastics, such that a user could press the first prong 140 and second prong 150 towards each other such that at least a portion of the first prong 140 seats within the channel 153 between the first 151 and second 152 layers of the second prong 150, resulting in the clip 110 tightening to secure a decoration or other object of an appropriate size.

Figure 2:
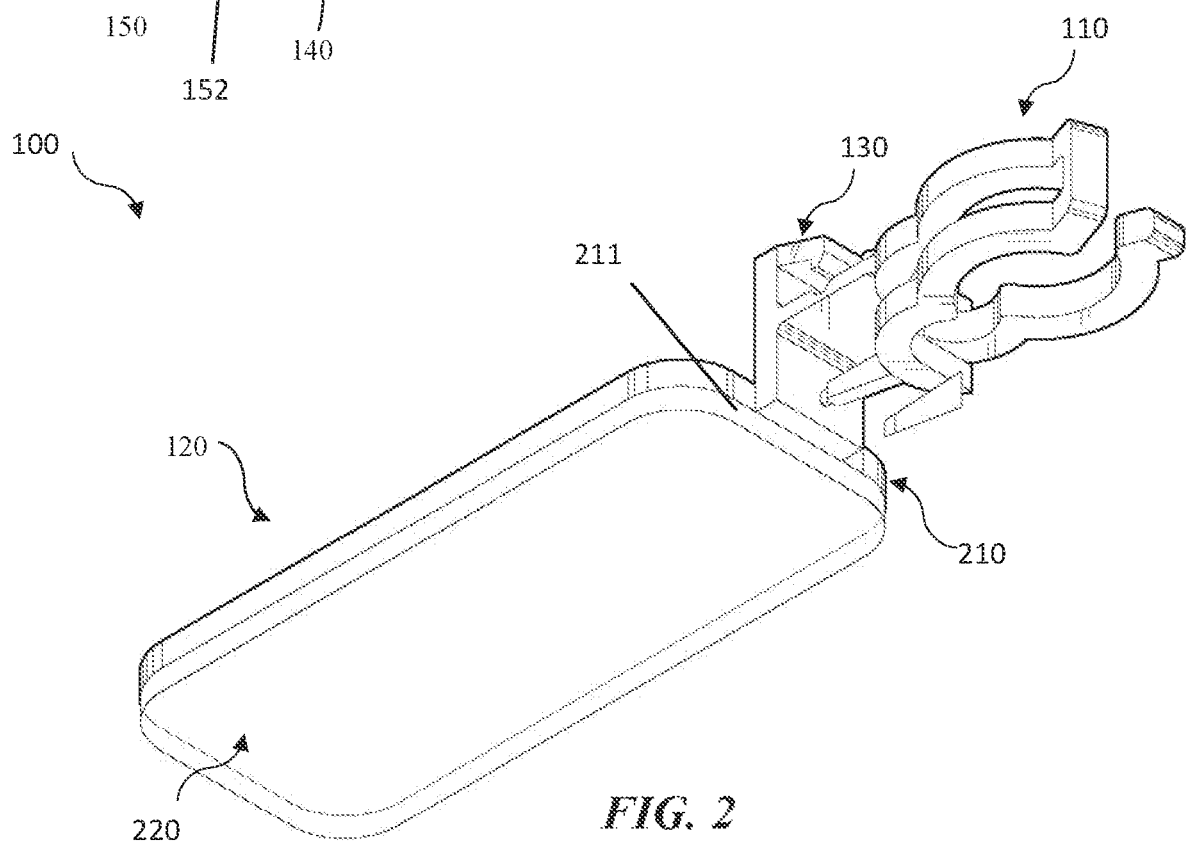
FIG. 2 representatively illustrates a bottom perspective view of an embodiment of a decoration hanging clip.

Referring now to FIG. 2, a bottom perspective view of an exemplary embodiment of the decoration hanging clip 100 is shown. In many embodiments an adhesive pad 120 may comprise a double-sided adhesive, a first side of which is configured to adhere to a first end 211 of a non-adhesive surface 210 which is coupled to the neck 120 of the decoration hanging clip 100. The second side 220 of the adhesive pad 120 is configured to hold the decoration hanging clip 100 in place when adhered to a surface of the user's choosing. In some embodiments a non-adhesive liner may cover the second side 220 of the adhesive layer 120 to prevent the adhesive layer 120 from adhering to surfaces unintentionally. In such an embodiment, the liner can be peeled or otherwise removed from the adhesive layer 120 to allow a user to adhere the second side 220 of the adhesive layer 220 to a surface, thus securing the decoration hanging clip 100 in a particular position. In some exemplary embodiments, the adhesive pad 120 may comprise a 100% acrylic adhesive or a nano tape adhesive, however a variety of different adhesives may be used to allow the decoration hanging clip 100 to adhere to a variety of different surfaces and in a variety of different orientations.

Figure 3:
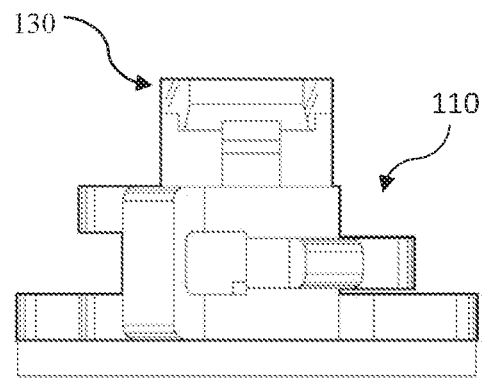
FIG. 3 and FIG. 4 representatively illustrate end views of an embodiment of a decoration hanging clip.
Figure 4:
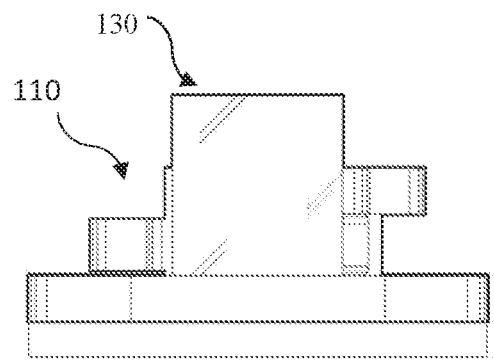

Referring now to FIGS. 3-4, longitudinal views of an exemplary embodiment of the decoration hanging clip 100 are shown. In many embodiments of the decoration hanging clip 100 the clip 110 and the adhesive pad 120 are on opposite sides of the neck 130. However, in other embodiments the clip 110 may be in a variety of positions on and around the neck 130 relative to the adhesive pad 120.

Referring now to FIGS. 5-6, side views of an exemplary embodiment of the decoration hanging clip 100 are shown. In many embodiments the neck 130 also comprises a catch 520 which is complementary to a hook 540 on the clip 110. In these and other embodiments a channel 530 is present on the clip 110, creating a thin portion of the clip 110 that allows the clip 110 to be rotated about an axis created by the channel 530. When the clip 110 is rotated, the hook 540 is able to couple with the catch 520, preventing the clip 110 from freely moving to its original position. In many embodiments the neck 130 may also comprise a support strut 510. In some embodiments the support strut 510 can be decoupled from the neck 130 when the clip 110 is rotated into the position where the hook 540 and catch 520 are coupled. In some of these embodiments, the support strut 510 is irreversibly decoupled from the neck 130.

Figure 7:
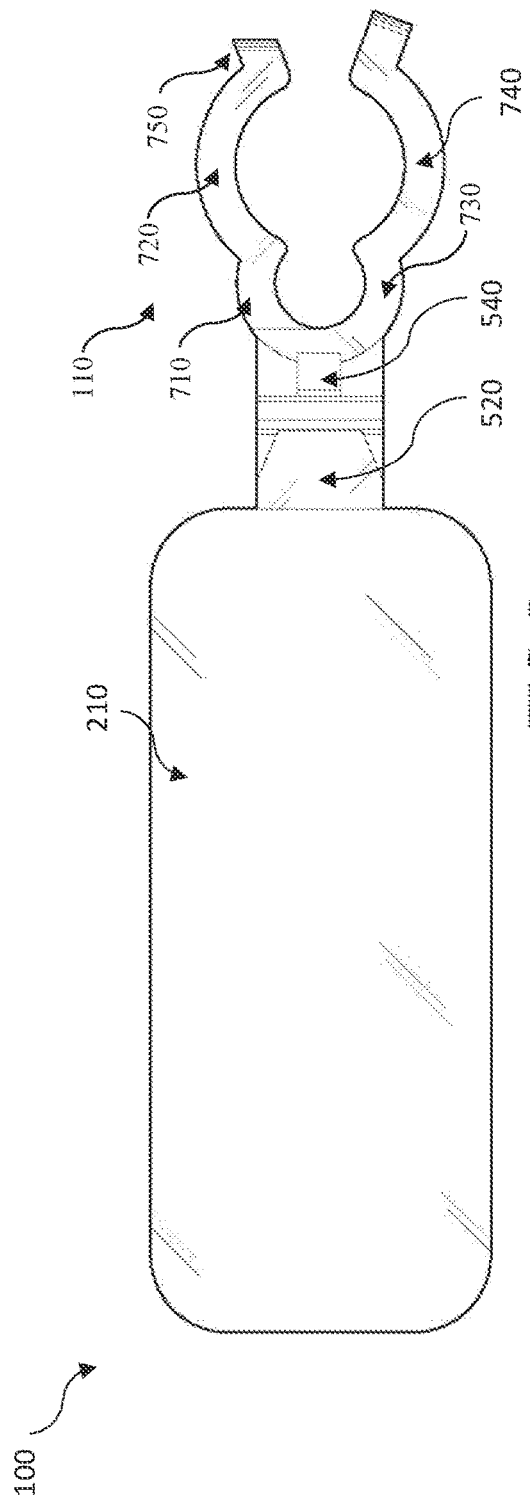
FIG. 7 representatively illustrates a top view of an embodiment of a decoration hanging clip.
Figure 8:
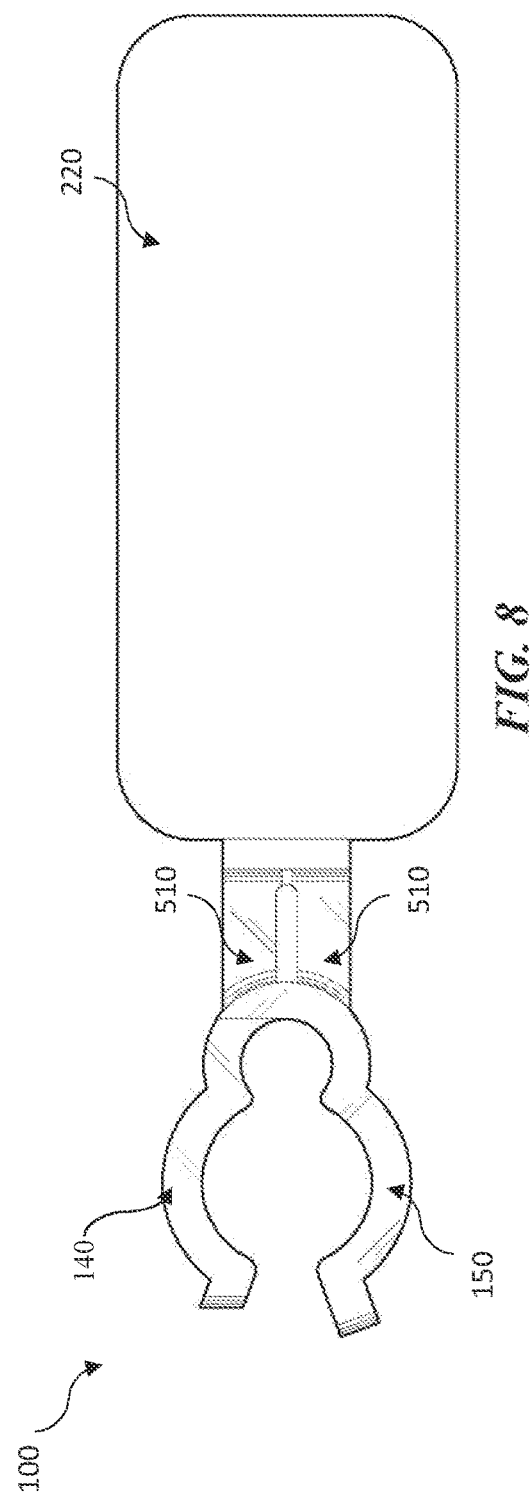
FIG. 8 representatively illustrates a bottom view of an embodiment of a decoration hanging clip.

Referring now to FIG. 7 and FIG. 8, a top and bottom view of the decoration hanging clip 100 are shown. In many embodiments the first prong 140 further comprises a first curved segment 710 and a second curved segment 720, and the second prong 150 further comprises a third curved segment 730 and fourth curved segment 740. In these and other embodiments a nub 750 may also be present on the first prong 140. When the first prong 140 and second prong 150 are tightened, the first curved segment 710 and third curved segment 730 may form a round structure with a smaller radius configured to hold a decoration, and the second curved segment 720 and the fourth curved segment 740 form a second, round structure with a larger radius configured to hold a decoration. In some embodiments when the first prong 140 and second prong 150 are pressed together to tighten the clip 110, the nub 750 may slide through the second prong 150 and act to lock the first prong 140 and second prong 150 together.

Figure 9:
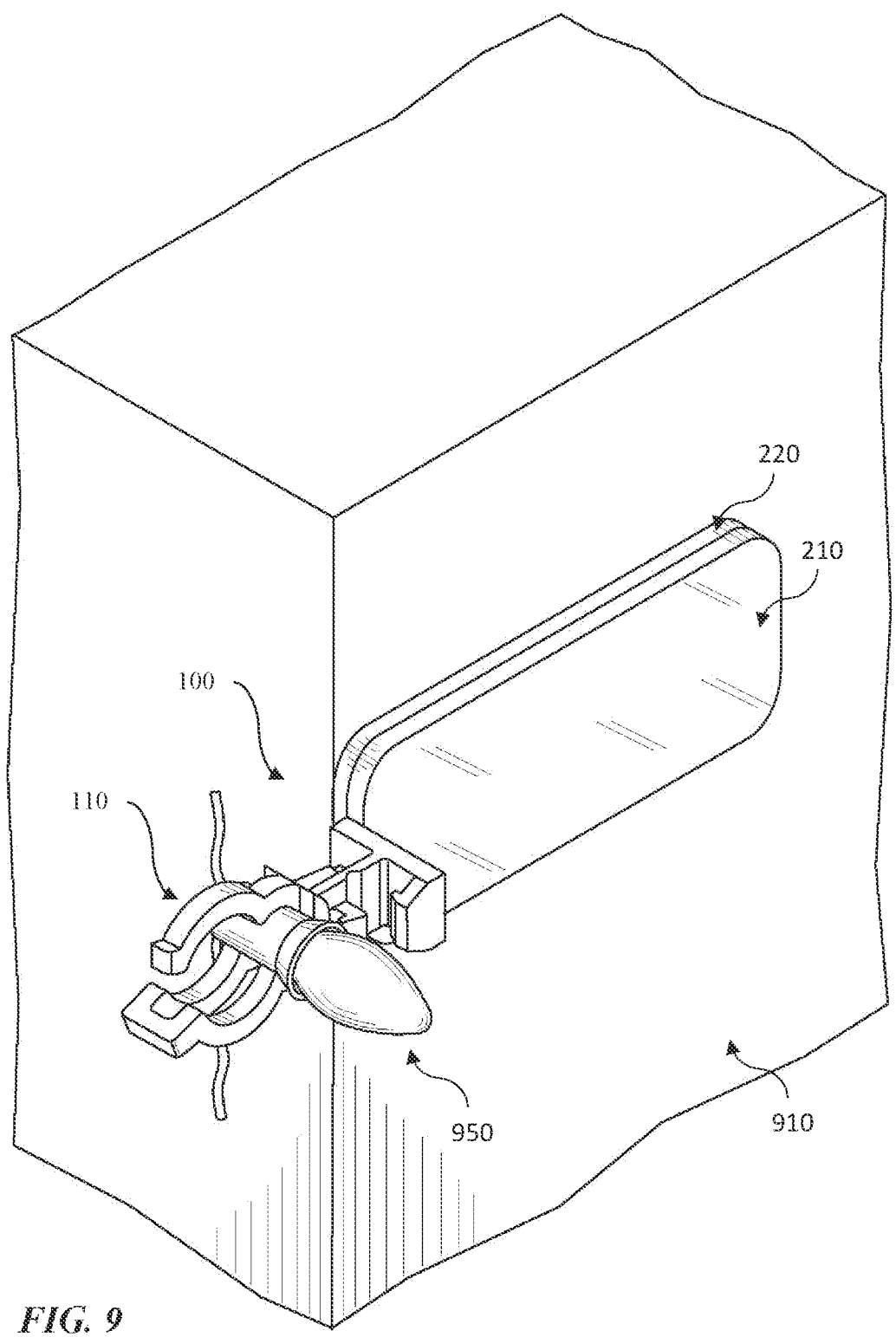
FIG. 9 depicts a perspective of an embodiment of a decoration hanging clip mounted to a surface with a decoration attached.

Referring now to FIG. 9 an exemplary embodiment of the decoration hanging clip 100 attached to a surface 910 via the adhesive layer 220 is shown. In many embodiments when the decoration hanging clip 100 is attached to a surface 910, a decoration 950 may be placed within the clip 110. In the embodiment depicted in FIG. 9, a bulb from a strand of lights is depicted, however a variety of different decorations may be used with the clip 110. In many embodiments a user may need to remove a non-adhesive liner from the second side of the adhesive layer 220 before adhering the decoration hanging clip 100 to a surface 910.

Figure 10:
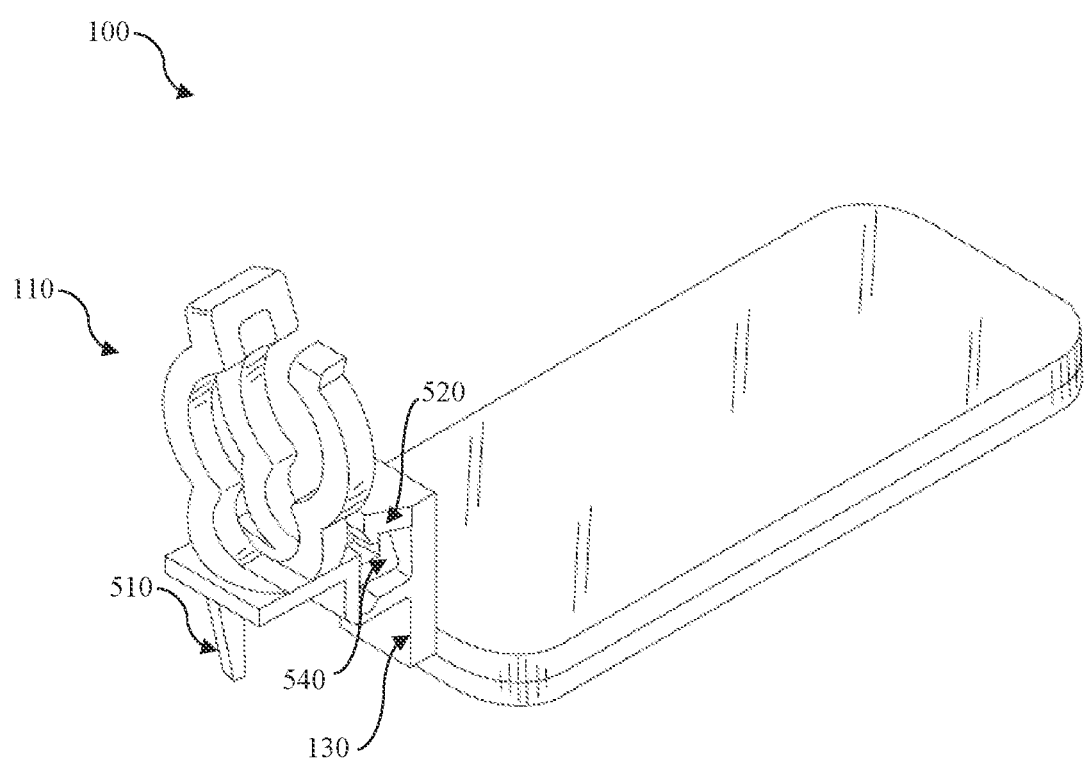
FIG. 10 depicts a top perspective view of an embodiment of a decoration hanging clip wherein the clip is in a rotated and locked position.

Referring now to FIG. 10, an exemplary embodiment of the decoration hanging clip 100 is shown with the clip 110 rotated at an approximately 90-degree angle from its original position in FIG. 1. This orientation allows the hook 540 to couple with the catch 520. In these and other embodiments, the support strut 510 may become decoupled from the neck 130 in order to accommodate the coupling of the hook 540 and the catch 520.

In places where the description above refers to particular embodiments of systems and methods for a decoration hanging clip, it should be readily apparent that a number of modifications may be made without departing from the spirit thereof and that these embodiments may be applied to other systems and methods for a decoration hanging clip.

I claim:

1. An apparatus for hanging decorations, the apparatus comprising:

a non-adhesive surface, the entirety of the non-adhesive surface comprising a substantially planar top surface and a substantially planar bottom surface;

a substantially planar adhesive pad comprising at least one adhesive surface, the substantially planar adhesive pad coupled to the substantially planar bottom surface of the substantially planar non-adhesive surface, wherein the adhesive pad comprises at least one of an acrylic adhesive and a nano tape adhesive;

a neck coupled to the non-adhesive surface at a first end of the non-adhesive surface, the neck substantially perpendicular to the non-adhesive surface; and a clip coupled to the neck at a point substantially distal from the non-adhesive surface, the clip substantially perpendicular to the neck and comprising:

a first prong; and a second dual-layer prong comprising a channel between a first layer and a second layer of the second dual-layer prong, the second dual-layer prong configured such that at least a portion of the first prong fits within the channel between the first and second layers of the second dual-layer prong and forms a substantially round structure configured to house a decoration therein.

2. The apparatus of claim 1 wherein the first prong further comprises a nub at a point distal from the neck, the nub configured to fit within the channel between the first and second layers of the second dual-layer prong, such that when the first prong is fitted within channel of the second dual-layer prong, the nub prevents the first prong from freely sliding back to its original position.

3. The apparatus of claim 1 wherein the neck further comprises a support strut which extends from a point substantially distal from the adhesive pad, the support strut coupled to the clip at a point along the strut distal from the neck.

4. The apparatus of claim 1 wherein the adhesive pad further comprises a non-adhesive liner coupled basally to the adhesive surface.

5. The apparatus of claim 1 wherein the clip is configured to articulate between a plane that is substantially parallel to the substantially planar non-adhesive surface and a plane that is substantially parallel to the neck.

6. The apparatus of claim 5 further comprising:

a hook coupled to the clip at a point on the clip proximal to the neck; and a catch coupled to the neck at a point on the neck distal from the adhesive pad, the catch configured such that when the clip is rotated toward the catch, the hook couples with the catch, and prevents the clip from freely rotating away from the catch.

7. The apparatus of claim 1 wherein:

the first prong comprises a first curved segment and a second curved segment, the second curved segment being substantially wider than the first curved segment; and the second dual-layer prong comprises a third curved segment and a fourth curved segment, the fourth curved segment being substantially wider than the third curved segment, and configured such that when the first prong is fitted within the channel of the second dual-layer prong, the clip forms two substantially circular gaps of different radii.

8. An apparatus for hanging decorations, the apparatus comprising:

a non-adhesive surface, the entirety of the non-adhesive surface comprising a substantially planar top surface and a substantially planar bottom surface;

a substantially planar adhesive pad comprising at least one adhesive surface, the substantially planar adhesive pad coupled to the substantially planar bottom surface of the substantially planar non-adhesive surface, wherein the adhesive pad comprises at least one of an acrylic adhesive and a nano tape adhesive;

a neck coupled to the non-adhesive surface at a first end of the non-adhesive surface, the neck substantially perpendicular to the non-adhesive surface;

a catch coupled to the neck at a point on the neck distal from the adhesive pad;

a clip coupled to the neck at a point between the non-adhesive surface and the catch, the clip substantially perpendicular to the neck and comprising:

a first prong; and a second dual-layer prong comprising a channel between a first layer and a second layer of the second dual-layer prong, the second dual-layer prong configured such that at least a portion of the first prong fits within the channel between the first and second layers of the second dual-layer prong and forms a substantially round structure; and a hook coupled to the clip at a point on the clip proximal to the neck, the hook configured such that when the clip is rotated toward the catch, the hook couples with the catch, and prevents the clip from freely rotating away from the catch.

9. The apparatus of claim 8 wherein the first prong further comprises a nub at a point distal from the neck, the nub configured to fit within the channel between the first and second layers of the second dual-layer prong, such that when the first prong is fitted within channel of the second dual-layer prong, the nub prevents the first prong from freely sliding back to its original position.

10. The apparatus of claim 8 wherein the neck further comprises a support strut coupled to the clip at a point along the strut distal from the neck.

11. The apparatus of claim 10 wherein the support strut is configured to decouple from the clip when the clip is rotated toward the catch.

12. The apparatus of claim 8 wherein the adhesive pad further comprises a non-adhesive liner coupled basally to the adhesive surface.

13. The apparatus of claim 8 wherein:

the first prong comprises a first curved segment and a second curved segment, the second curved segment being substantially wider than the first curved segment; and the second dual-layer prong comprises a third curved segment and a fourth curved segment, the fourth curved segment being substantially wider than the third curved segment, and configured such that when the first prong is fitted within the channel of the second dual-layer prong, the clip forms two substantially circular gaps of different radii.

14. A method for hanging decorations, the method comprising:

attaching a decoration hanging clip to a surface, the decoration hanging clip comprising:

a non-adhesive surface, the entirety of the non-adhesive surface comprising a substantially planar top surface and a substantially planar bottom surface;

a substantially planar adhesive pad comprising at least one adhesive surface, the substantially planar adhesive pad coupled to the substantially planar bottom surface of the substantially planar non-adhesive surface, the substantially planar adhesive pad comprising at least one of an acrylic adhesive and a nano tape adhesive;

a neck coupled to the non-adhesive surface at a first end of the non-adhesive surface, the neck substantially perpendicular to the non-adhesive surface;

a catch coupled to the neck at a point on the neck distal from the adhesive pad;

a clip coupled to the neck at a point between the non-adhesive surface and the catch, the clip substantially perpendicular to the neck and comprising:
  a first prong; and
  a second dual-layer prong comprising a channel between a first layer and a second layer of the second dual-layer prong, the second dual-layer prong configured such that at least a portion of the first prong fits within the channel between the first and second layers of the second dual-layer prong and forms a substantially round structure; and a hook coupled to the clip at a point on the clip proximal to the neck, the hook configured such that when the clip is rotated toward the catch, the hook couples with the catch, and prevents the clip from freely rotating away from the catch; and securing a decoration within the clip between the first prong and the second dual-layer prong.

15. The method of claim 14 further comprising:
applying pressure to at least one of the first prong and the second dual-layer prong to cause the first prong to fit within the channel between the first and second layers of the second dual-layer prong until the substantially round structure snugly fits a size of the decoration.

16. The method of claim 14 wherein the decoration hanging clip further comprises a non-adhesive liner coupled basally to the adhesive surface, and the method further comprises removing the non-adhesive liner from the adhesive surface.

17. The method of claim 14 wherein the first prong of the decoration hanging clip further comprises a nub at a point distal from the neck, the nub configured to fit within the channel between the first and second layers of the second dual-layer prong, such that when the first prong is fitted within channel of the second dual-layer prong, the nub prevents the first prong from freely sliding back to its original position.

18. The method of claim 14 further comprising rotating the clip of the decoration hanging clip until the hook is coupled to the catch.

19. The method of claim 14 wherein the decoration hanging clip further comprises:
the first prong having a first curved segment and a second curved segment, the second curved segment being substantially wider than the first curved segment; and
the second dual-layer prong comprises a third curved segment and a fourth curved segment, the fourth curved segment being substantially wider than the third curved segment and configured such that when the first prong is fitted within the channel of the second dual-layer prong, the clip forms two substantially circular gaps of different radii.

\* \* \* \* \*